Patented Feb. 4, 1941

2,230,371

UNITED STATES PATENT OFFICE 2,230,371

STABILIZATION OF ORGANIC SUBSTANCES

Elmer Keiser Bolton, Wilmington, Del., assignor to E. I. du Pont de Nemours & Company, Wilmington, Del., a corporation of Delaware No Drawing. Application November 4, 1939, Serial No. 302,856

24 Claims. (Cl. 44—9)

This invention relates to the stabilization of organic substances, and particularly to the protection of organic substances against the deleterious action of oxygen catalyzed by the presence of copper and its compounds, and more particularly to the preservation of oxidizable mineral hydrocarbons containing, or in contact with, copper and its compounds.

Many organic substances, such as animal and vegetable fats and oils, edible oils, fruit and vegetable juices, textile fibers, rubber, petroleum products, photographic developers and synthetic unsaturated compounds, deteriorate upon exposure to the atmosphere over periods of time, which deterioration is due to oxygen. Such attack by oxygen produces oxidation products, disaggregation or depolymerization, or a combination thereof. The disaggregation and depolymerization is generally induced by the primary oxidation products which apparently act as catalysts to accelerate the deterioration. This phenomenon, generally termed auto-oxidation, usually proceeds very slowly at first, but gradually accelerates until a maximum is reached. The initial period of negligible reaction rate is called the induction period. Such deterioration imparts undesirable qualities to the organic substances and eventually destroys their usefulness.

Signal success has been achieved in recent years in the preservation of many organic substances by the discovery and use of compounds generally called "oxidation inhibitors," "antioxidants," "preservatives," "anti-agers" and "gum inhibitors." Such agents, which are mostly oxidizable organic compounds, are oxidized in the course of time, and hence the beneficial effect obtained by their use is not permanent. They protect the organic substances from oxidation only so long as they themselves are not converted by oxidation to products having no antioxidant properties.

It is well known that copper and its compounds promote the formation of gum in gasoline, speed the aging of rubber and the development of rancidity in fats and oils. In other words, copper and its compounds accelerate the rate of oxidation of oxidizable organic substances, including most of the antioxidants. Accordingly, copper and antioxidants are antagonistic in action and the normal effect of the antioxidant is greatly reduced in the presence of copper and its compounds.

Copper as such, or in the form of its compounds, occurs naturally in many organic products, frequently in such slight amounts as to cause very little harm. However, the concentration of copper and its compounds is frequently increased during the course of handling and utilizing the substances. Vessels and conduits made of metals containing copper are used for storage and transportation. Ingredients contaminated with copper or its compounds are sometimes added to the organic substances. In some cases, copper, as such or in the form of its compounds, is actually required in at least one of the steps in the preparation of the organic substances, as in the sweetening of gasoline with cupric chloride. Therefore, although copper and its compounds are not necessarily inherently present in organic substances, they are frequently present, at least accidentally, in many organic substances. The activity of copper and its compounds to catalyze oxidation of oxidizable organic substances is inherent and is possessed by the copper in the various media, unless the activity has been modified or suppressed by chemical means. Compounds capable of effectively suppressing the catalytic activity of copper and its compounds are hereinafter named generically as "copper deactivators."

While antioxidants are generally quite specific in their effects, it has been found that the only requirement in a copper deactivator is that it be specific for copper and its compounds. It is desirable that the deactivator be soluble in the organic substance to be protected in order to be effective.

An object of the present invention is to retard the deterioration of organic substances caused by the action of molecular oxygen and promoted by the presence of copper and its compounds. Another object is to provide a class of organic compounds which, when added to an organic substance normally subject to deterioration by oxygen in the presence of copper and its compounds will suppress the activity of the copper or its compounds. A further object is to provide a method for rendering antioxidants more effective for the preservation of organic substances in the presence of copper and its compounds. A still further object is to provide a class of organic compounds which, when added to an organic substance in the presence of an antioxidant and in the presence of copper or its compounds, increases the efficiency of the antioxidant. Still further objects are to inhibit the formation of color, acids, gum, sludge and the like in mineral hydrocarbons containing or in contact with copper or its compounds, and particularly in liquid hydrocarbon fuels of the gasoline, kerosene, and gas oil boiling range. Other objects are to provide new compositions of matter and to advance the art. Still other objects will appear hereinafter.

The above and other objects may be accomplished by incorporating in organic substances subject to oxidative decomposition, catalyzed by copper and its compounds, a small amount of a phosphorus compound selected from the class of organic monophosphonic acids and organic dihydroxyphosphines. These compounds are characterized by having the organic radical directly attached to the phosphorus atom and by having two hydrogens replaceable by metal, and may be represented by the type formulae given below:

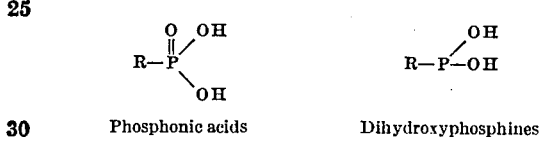

Phosphonic acids      Dihydroxyphosphines wherein R is an organic radical selected from the class of hydrocarbon radicals, e. g., alkyl, aralkyl, and aryl radicals, etc., hydroxy substituted hydrocarbon radicals, and acyl radicals. Of the organic monophosphonic acids and the most effective are those in which the phosphone group is directly attached either to an aryl nucleus or to a hydroxyalkane residue. Of the organic dihydroxyphosphines the most effective are the monoaryl dihydroxyphosphines. Examples of compounds of these preferred classes are:

2-hydroxy-2-propanephosphonic acid
12-hydroxy-12-tricosanephosphonic acid
Benzene phosphonic acid
Phenyl dihydroxyphosphine By the term "aryl" I mean a monovalent aromatic hydrocarbon radical in which the free valence belongs to the ring. By the term "alkyl" I mean a cyclic or acyclic radical derived from a cyclic or acyclic aliphatic hydrocarbon by removal of one hydrogen atom. By the term "hydroxy-alkane" I mean a monovalent radical derived from an aliphatic hydrocarbon and which except for the hydroxyl group consists of carbon and hydrogen.

The quantity of copper deactivator added will be dependent upon the amount of copper present in the organic substance. At least one mole of copper deactivator must be added for each atom of copper in the organic substance. Preferably from about 1.5 to 100 moles of copper deactivator is used for each atom of copper in the organic substance. From about 0.001 to about 0.01% of copper deactivator based on the organic substance will generally be satisfactory in most organic substances where the copper or copper compound is accidentally present although from as low as 0.0005% to as high as 0.5% may be employed. Higher ratios of copper deactivator may be used, particularly when the organic substance is in contact with metallic copper in bulk which forms a reservoir of copper ions.

In order to illustrate my invention more clearly and the preferred modes for carrying the same into effect and the advantageous results to be obtained thereby, the following examples and tests are given.

EXAMPLE I

Forty grams of acetone, dried over sodium sulfate, and 120 grams phosphorus trichloride were mixed at 0° C. in a 500-cc. round-bottom 3-necked flask. After standing 15 minutes 129 grams of glacial acetic acid was added rapidly. After a few minutes a vigorous reaction set in which was controlled by cooling the flask with ice. The mixture, after standing 2 days, was stirred vigorously for 1 hour, then subjected to a 15 mm. vacuum for 2 hours. Water was added and the homogeneous mixture allowed to evaporate on a steam bath. The residue, after drying in a vacuum desiccator for 24 hours was a pasty mass weighing 140 grams. Treatment of this material with dilute hydrochloric acid and extraction with ethyl acetate yielded a crystalline product having a melting point of 166° C. This compound is 2-hydroxy-2-propanephosphonic acid, $(CH_3)_2C(OH)PO_3H_2$.

EXAMPLE II 12-hydroxy-12-tricosanephosphonic acid was prepared in a manner similar to Example 1, using tricosanone-12 in place of acetone.

The remaining compounds were prepared by well-known methods which need not be detailed here.

The effectiveness of the compounds of the type given above in inhibiting oxidation was determined in commercial blends of cracked and straight-run gasolines completely refined but otherwise untreated with chemical agents, such as dyes, anti-knocks, and antioxidants. Since gasoline is a mixture of variable composition, identical results are not obtained with different samples.

p-Benzylaminophenol, abbreviated BAP, and copper oleate, abbreviated Cu, have been chosen as a representative gasoline antioxidant and copper catalyst, respectively. The phosphorus compounds will be referred to as deactivators.

The method used for determining the gum inhibiting qualities was developed by Voorhees and Eisinger (S. A. E. Journal, volume 24, 584 (1929)) and consists in shaking 100 cc. of the gasoline at 100° C. in a 1-liter Pyrex flask containing pure oxygen. The internal pressure is observed every 10 minutes by means of a manometer attached to the system. The elapsed time from the start of the test until the gasoline begins to absorb oxygen at the rate of 10 cc. per 10 minutes, as shown by the fall in internal pressure, is taken as the induction period. It has been found that the induction period obtained by this method, although greatly shortened, is a fairly accurate measure of the gum formation rate of gasoline under normal storage conditions. The data obtained in this test are summarized in Table I. Two compounds marked with asterisks, diphenyl phosphate and the dodecyl ester of beta-benzoyl-alpha-phenylethanephosphonic acid, are included in the table, although they do not fall within the scope of the compounds claimed in this invention since they possess only one hydrogen atom capable of replacement by a metal. Both of these compounds are substantially without effect on the induction period of the gasoline.

TABLE I
*Phosphorus compound in oil*

| Name | Percent by weight | Percent by weight of benzyl-amino-phenol | Percent by weight of copper | Induction period, minutes |
|---|---|---|---|---|
|  | None | None | None | 210 |
|  | None | 0.0013 | None | 380 |
|  | None | 0.0013 | 0.0001 | 60 |
| Benzenephosphonic acid | 0.005 | 0.0013 | 0.0001 | 440 |
| Phenyl dihydroxyphosphine | 0.005 | 0.0013 | 0.0001 | 230 |
| Diphenyl phosphate* | 0.005 | 0.0013 | 0.0001 | 70 |
|  | None | None | None | 210 |
|  | None | 0.0015 | None | 420 |
|  | None | 0.0015 | 0.0001 | 60 |
| beta - Benzoyl - alpha - phenyl - ethanephosphonic acid | 0.005 | 0.0015 | 0.0001 | 200 |
| Dodecyl ester of above acid* | 0.005 | 0.0015 | 0.0001 | 70 |
|  | None | 0.0050 | 0.0001 | 20 to 30 |
| 12 - hydroxy - 12 - tricosane-phosphonic acid | 0.005 | 0.0050 | 0.0001 | 100 |
|  | None | None | None | 140 |
|  | None | 0.0020 | None | 380 |
|  | None | 0.0020 | 0.0001 | 230 |
| 2 - hydroxy-2 - propane-phosphonic acid | 0.0001 | 0.0020 | 0.0001 | 450 |

EXAMPLE III
*Stabilization of photographic developers*

Two fifty gram samples of a standard Metol-hydro-quinone developer containing sodium carbonate were placed in 2 oz. wide mouth bottles and to one was added 0.5% by weight of 2-hydroxy-2-propanephosphonic acid and the other was used as a control. After standing 9 days in contact with the atmosphere, the comparative color of the samples was determined in a Duboscq colorimeter. The results are shown below, the higher readings indicating a lighter color.

| Sample | Duboscq reading |
|---|---|
| Control | 30.0 |
| Containing the phosphonic acid | 35.7 |

A different portion of the above developer (which had been used in preparing a number of prints and negatives) was treated similarly with the following result.

| Sample | Duboscq reading |
|---|---|
| Control | 15 |
| Containing the phosphonic acid | 19.5 |

In each case the developer containing the 2-hydroxy-2-propanephosphonic acid showed the greater stability against color development brought about by oxidation.

Under the same conditions monophenyl phosphate was ineffective.

EXAMPLE IV
*Stabilization of butter*

Forty-three grams of the butter were placed in 125 cc. Erlenmeyer flasks and the various chemicals added as indicated below. Copper was added in the form of copper oleate in such quantities as to produce a concentration of 10 parts per million while benzylaminophenol was added in 0.005% concentration. The phosphorus compound was used in 0.01% concentration. The flasks were placed uncorked in an oven at 50° to 55° C., and removed after one day for inspection with respect to odor. The results are as follows:

|  | Odor |
|---|---|
| Butter alone (control) | Good |
| Butter plus benzylaminophenol | Good |
| Butter plus benzylominophenol plus copper | Poor |
| Butter plus benzylaminophenol plus copper plus 2-hydroxy-2-propanephosphonic acid | Good |
| Butter plus copper | Poor |

The above data show that the phosphonic acid exerts a stabilizing effect on butter in the presence of copper. Similar results were obtained with lard and olive oil.

In the examples given, the copper deactivators have been used in conjunction with a known antioxidant whose efficiency is seriously impaired by the presence of traces of metals. Other antioxidants which may be used with the copper deactivators are p-butylaminophenol, p-isobutylaminophenol, dianiline salt of hydroquinone, aniline salt of beta-naphthol, ring-substituted aminophenols such as isopropyl-N-dimethylaminophenol, cyclohexylpyrogallol, cyclohexyl-alpha-naphthylamine, tri(beta-acetoxyethyl) amine, hydroxydiphenylamine, indophenol dyes, phenol ethers, cresols, dimethyl maleate, diethyl phthalate, and metallic derivatives such as tin and chromium oleates. These copper deactivators may also be used in conjunction with anti-knock agents such as tetraethyllead and materials used for gum-fluxing purposes.

My copper deactivators may be added to the organic substances to be treated in any desirable form and manner. They may be in solid or liquid form or dissolved in a solvent. They may be added to the finished organic substances or to such substances at any stage in the processes of manufacture and handling. Besides many others the following compounds fall within my invention and will be copper deactivators.

2-hydroxy-2-octanephosphonic acid
2-hydroxy-2-butanephosphonic acid
Beta-hydroxy-ethanephosphonic acid
Beta-chloroethanephosphonic acid
Gamma-nitropropanephosphonic acid
Beta-naphthalenephosphonic acid
Para-chlorobenzenephosphonic acid
2,4-dimethyl-3-hydroxy-3-butanephosphonic acid
Para-nitrobenzenephosphonic acid
1-hydroxy-1-cyclohexanephosphonic acid
Cyclohexanephosphonic acid
Methanephosphonic acid
Ethanephosphonic acid
Propanephosphonic acid
Butanephosphonic acid
Pentanephosphonic acid
Hexanephosphonic acid
Alpha-phenacyl-alpha-toluenephosphonic acid
2-hydroxynonanephosphonic acid
Para-toluenephosphonic acid
2, 4-xylenephosphonic acid
p-Tolyl dihydroxyphosphine
2, 4-dimethylphenyl dihydroxyphosphine
p-Nitrophenyl dihydroxyphosphine
2-hydroxy-2-propyl dihydroxyphosphine
12-hydroxy-12-tricosyl dihydroxyphosphine
Alpha-phenacylbenzyl dihydroxyphosphine
2-hydroxy-2-octyl dihydroxyphosphine
2-hydroxy-2-butyl dihydroxyphosphine Ethyl dihydroxyphosphine
Phenyl dihydroxyphosphine
Butyl dihydroxyphosphine
Cyclohexyl dihydroxyphosphine
Beta-chloroethyl dihydroxyphosphine
Beta-naphthyl dihydroxyphosphine
Hexyl dihydroxyphosphine
Methyl dihydroxyphosphine
3 - hydroxy-2-methyl - 3 - pentyl dihydroxyphosphine
1-hydroxy-1-cyclohexyl dihydroxyphosphine Mixtures of two or more of such copper deactivators may be employed; also mixtures of such copper deactivators with other copper deactivators may be employed as desired.

While my invention is primarily concerned with inhibiting the catalytic deterioration of liquid mineral hydrocarbons and particularly those of the gasoline, kerosene, and gas oil boiling ranges, my copper deactivators will be found to be effective in various petroleum products such as transformer oils, lubricating oils, greases, fats, waxes, animal and vegetable fats and oils and derivatives obtained therefrom such as soaps, sulfonated and sulfated oils including alcohol sulfates, fruit and vegetable juices, essential oils, perfumes, cotton, silk, wool, paper, cellulose acetate, regenerated cellulose products, synthetic products such as photographic developers, antioxidants, and conjugated dienes and their polymerization products, particularly chloro-2-butadiene-1, 3 polymerization products such as those known under the trade names of neoprene and neoprene latex. They are particularly well adapted for use in fuels for spark ignition engines and Diesel engines. They may also be employed in pure organic compounds such as isopentane, cetene, isooctane, diisopropyl ether, and synthetic fuels such as polymerized cracked refinery gases.

By my invention I have made it possible to stabilize many organic substances susceptible to the harmful action of oxygen catalyzed by copper and its compounds. I have also shown that the deactivators are effective either alone or in combination with an amount of antioxidant which is generally required to stabilize the organic substances in the absence of copper. Thus I have made it possible to stabilize organic substances effectively and economically in the presence of copper and its compounds without it being necessary to employ large amounts of antioxidants to overcome the catalytic action of the copper. More particularly I have made it possible to produce liquid hydrocarbon fuels of high stability against deterioration through gum formation and through development of oxidation products under conditions in which the fuel comes in contact with copper or its derivatives which considerably diminish the effectiveness of previously known stabilizers.

While I have disclosed the preferred embodiments of my invention and the preferred modes of carrying the same into effect, it will be apparent to those skilled in the art that many variations and modifications may be made therein without departing from the spirit of my invention. Accordingly, the scope of my invention is not to be limited to the specific embodiments hereinbefore disclosed but it will be understood that I intend to claim my invention broadly as in the appended claims.

I claim:

1. The method of inhibiting the catalytic deterioration of an organic substance caused by a member of the group consisting of copper and its compounds in the presence of oxygen which comprises incorporating in said organic substance a small proportion of a phosphorus compound selected from the class of organic monophosphonic acids and organic dihydroxyphosphines.

2. The method of inhibiting the catalytic deterioration of an organic substance caused by a member of the group consisting of copper and its compounds in the presence of oxygen which comprises incorporating in said organic substance a small proportion of an organic monophosphonic acid.

3. The method of inhibiting the catalytic deterioration of an organic substance caused by a member of the group consisting of copper and its compounds in the presence of oxygen which comprises incorporating in said organic substance a small proportion of an organic monophosphonic acid.

4. The method of inhibiting the catalytic deterioration of an organic substance caused by a member of the group consisting of copper and its compounds in the presence of oxygen which comprises incorporating in said organic substance a small proportion of an hydroxyalkanemonophosphonic acid.

5. The method of inhibiting the catalytic deterioration of an organic substance caused by a member of the group consisting of copper and its compounds in the presence of oxygen which comprises incorporating in said organic substance a small proportion of 2-hydroxy-2-propanephosphonic acid.

6. The method of inhibiting the catalytic deterioration of an organic substance caused by a member of the group consisting of copper and its compounds in the presence of oxygen which comprises incorporating in said organic substance a small proportion of an aromatic monophosphonic acid.

7. The method of inhibiting the catalytic deterioration of an organic substance caused by a member of the group consisting of copper and its compounds in the presence of oxygen which comprises incorporating in said organic substance a small proportion of benzene phosphonic acid.

8. The method of inhibiting the catalytic deterioration of an organic substance caused by a member of the group consisting of copper and its compounds in the presence of oxygen which comprises incorporating in said organic substance a small proportion of a mono-organic dihydroxyphosphine.

9. The method of inhibiting the catalytic deterioration of an organic substance caused by a member of the group consisting of copper and its compounds in the presence of oxygen which comprises incorporating in said organic substance a small proportion of a monoaryl dihydroxyphosphine.

10. The method of inhibiting the catalytic deterioration of an organic substance caused by a member of the group consisting of copper and its compounds in the presence of oxygen which comprises incorporating in said organic substance a small proportion of phenyl dihydroxyphosphine.

11. The method of inhibiting the catalytic deterioration of a liquid hydrocarbon fuel caused by a member of the group consisting of copper and its compounds in the presence of oxygen which comprises incorporating in said liquid hydrocarbon fuel a small proportion of a phosphorus compound selected from the class of organic monophosphonic acids and organic dihydroxyphosphines.

12. The method of inhibiting the catalytic deterioration of gasoline caused by a member of the group consisting of copper and its compounds in the presence of oxygen which comprises incorporating in said gasoline a small proportion of a phosphorus compound selected from the class of organic monophosphonic acids and organic dihydroxyphosphines.

13. The method of inhibiting the catalytic deterioration of an organic substance caused by a member of the group consisting of copper and its compounds in the presence of oxygen and inhibiting the deleterious effect of copper and its compounds on an antioxidant in said organic substance, which antioxidant is normally effective in materially retarding deterioration of said organic substance in the absence of copper and its compounds but which is less effective in the presence of copper and its compounds, which comprises incorporating in said organic substance a small proportion of a phosphorus compound selected from the class of organic monophosphonic acids and organic dihydroxyphosphines.

14. The method of inhibiting the catalytic deterioration of a liquid hydrocarbon fuel caused by a member of the group consisting of copper and its compounds in the presence of oxygen and inhibiting the deleterious effect of copper and its compounds on an antioxidant in said liquid hydrocarbon fuel, which antioxidant is normally effective to materially retard deterioration of said liquid hydrocarbon fuel in the absence of copper and its compounds but which is less effective in the presence of copper and its compounds, which comprises incorporating in said liquid hydrocarbon fuel a small proportion of a phosphorus compound selected from the class of organic monophosphonic acids and organic dihydroxyphosphines.

15. An organic substance, normally subject to catalytic deterioration caused by a member of the group consisting of copper and its compounds in the presence of oxygen, having incorporated therein a small proportion, sufficient to inhibit the catalytic action of the copper and its compounds, of a phosphorus compound selected from the class of organic monophosphonic acids and organic dihydroxyphosphines.

16. A liquid hydrocarbon fuel, normally subject to catalytic deterioration caused by a member of the group consisting of copper and its compounds in the presence of oxygen, having incorporated therein a small proportion, sufficient to inhibit the catalytic action of the copper and its compounds, of a phosphorus compound selected from the class of organic monophosphonic acids and organic dihydroxyphosphines.

17. An organic substance, normally subject to catalytic deterioration caused by a member of the group consisting of copper and its compounds in the presence of oxygen, containing a small amount of an antioxidant, normally effective to materially retard deterioration of said organic substance in the absence of copper and its compounds but which is less effective in the presence of copper and its compounds, and having incorporated therein a small proportion, sufficient to inhibit the catalytic action of the copper and its compounds, of a phosphorus compound selected from the class of organic monophosphonic acids and organic dihydroxyphosphines.

18. A liquid hydrocarbon fuel, normally subject to catalytic deterioration caused by a member of the group consisting of copper and its compounds in the presence of oxygen, containing a small amount of an antioxidant, normally effective to materially retard deterioration of said liquid hydrocarbon fuel in the absence of copper and its compounds but which is less effective in the presence of copper and its compounds, and having incorporated therein a small proportion, sufficient to inhibit the catalytic action of the copper and its compounds, of a phosphorus compound selected from the class of organic monophosphonic acids and organic dihydroxyphosphines.

19. An organic substance, normally subject to catalytic deterioration caused by a member of the group consisting of copper and its compounds in the presence of oxygen, having incorporated therein a small proportion, sufficient to inhibit the catalytic action of the copper and its compounds, of an aliphatic monophosphonic acid.

20. An organic substance, normally subject to catalytic deterioration caused by a member of the group consisting of copper and its compounds in the presence of oxygen, having incorporated therein a small proportion, sufficient to inhibit the catalytic action of the copper and its compounds, of 2-hydroxy-2-propanephosphonic acid.

21. An organic substance, normally subject to catalytic deterioration caused by a member of the group consisting of copper and its compounds in the presence of oxygen, having incorporated therein a small proportion, sufficient to inhibit the catalytic action of the copper and its compounds, of an aromatic monophosphonic acid.

22. An organic substance, normally subject to catalytic deterioration caused by a member of the group consisting of copper and its compounds in the presence of oxygen, having incorporated therein a small proportion, sufficient to inhibit the catalytic action of the copper and its compounds, of benzene phosphonic acid.

23. An organic substance, normally subject to catalytic deterioration caused by a member of the group consisting of copper and its compounds in the presence of oxygen, having incorporated therein a small proportion, sufficient to inhibit the catalytic action of the copper and its compounds, of a monoaryl dihydroxyphosphine.

24. An organic substance, normally subject to catalytic deterioration caused by a member of the group consisting of copper and its compounds in the presence of oxygen, having incorporated therein a small proportion, sufficient to inhibit the catalytic action of the copper and its compounds, of phenyl dihydroxyphosphine.

ELMER KEISER BOLTON.

CERTIFICATE OF CORRECTION.

Patent No. 2,230,371. February 4, 1941.

ELMER KEISER BOLTON.

It is hereby certified that error appears in the printed specification of the above numbered patent requiring correction as follows: Page 4, second column, line 18, claim 3, for the word "organic" read --aliphatic--; and that the said Letters Patent should be read with this correction therein that the same may conform to the record of the case in the Patent Office.

Signed and sealed this 11th day of March, A. D. 1941.

(Seal)

Henry Van Arsdale,
Acting Commissioner of Patents.